No. 641,726. Patented Jan. 23, 1900.
F. PHILIPS.
WHEEL CONSTRUCTION.
(Application filed Jan. 21, 1899.)
(No Model.)  5 Sheets—Sheet 1.
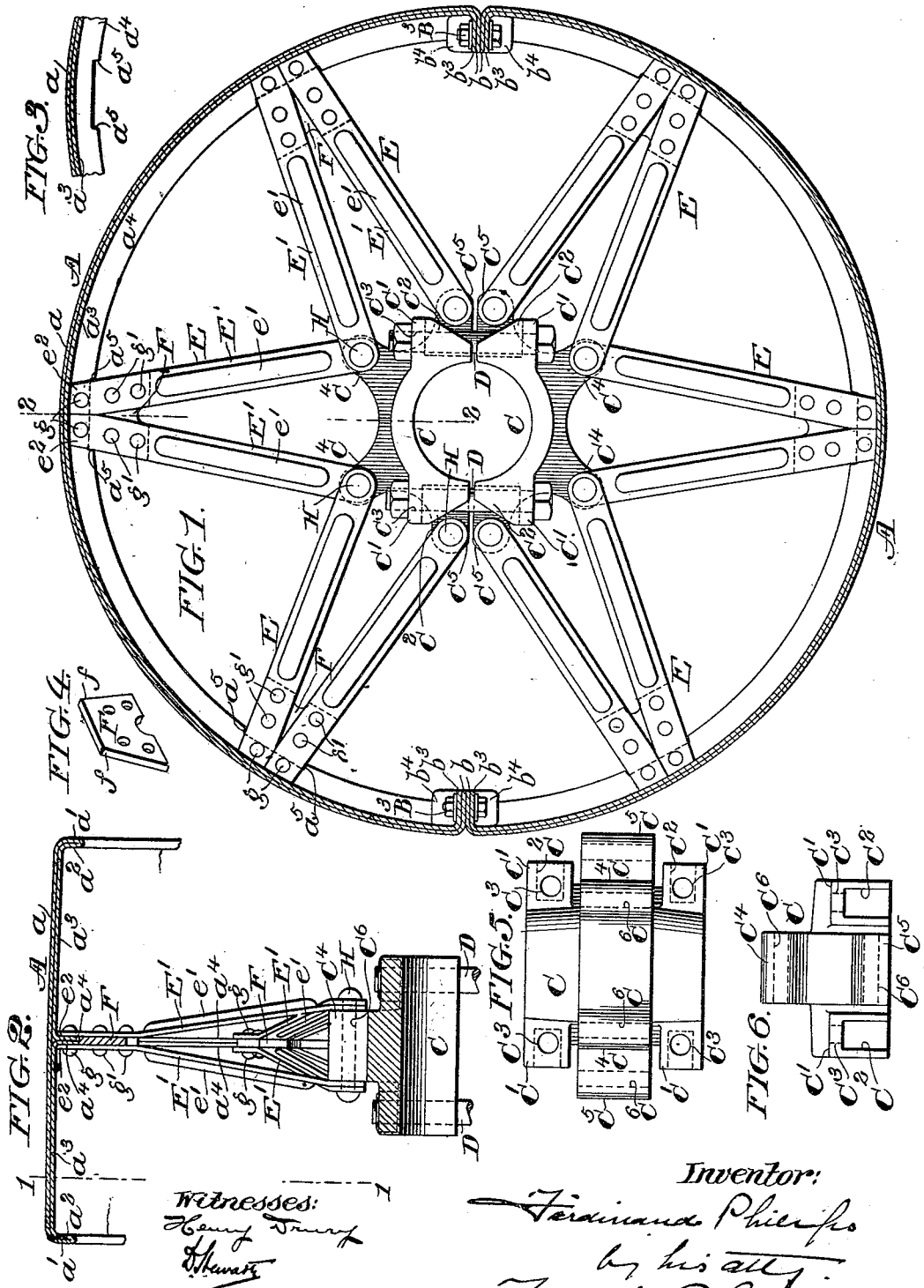

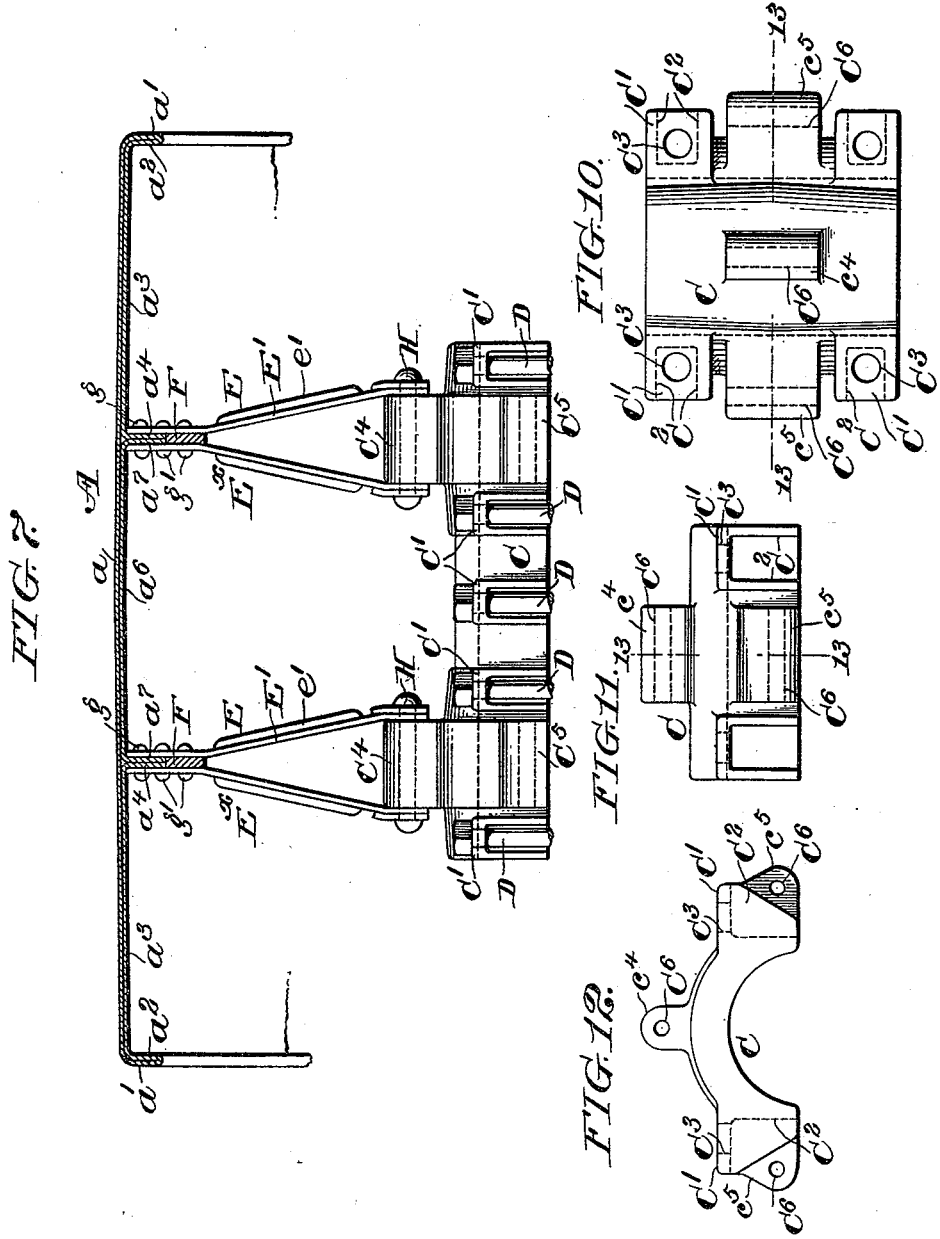

No. 641,726. Patented Jan. 23, 1900.
F. PHILIPS.
WHEEL CONSTRUCTION.
(Application filed Jan. 21, 1899.)
(No Model.) 5 Sheets—Sheet 3.
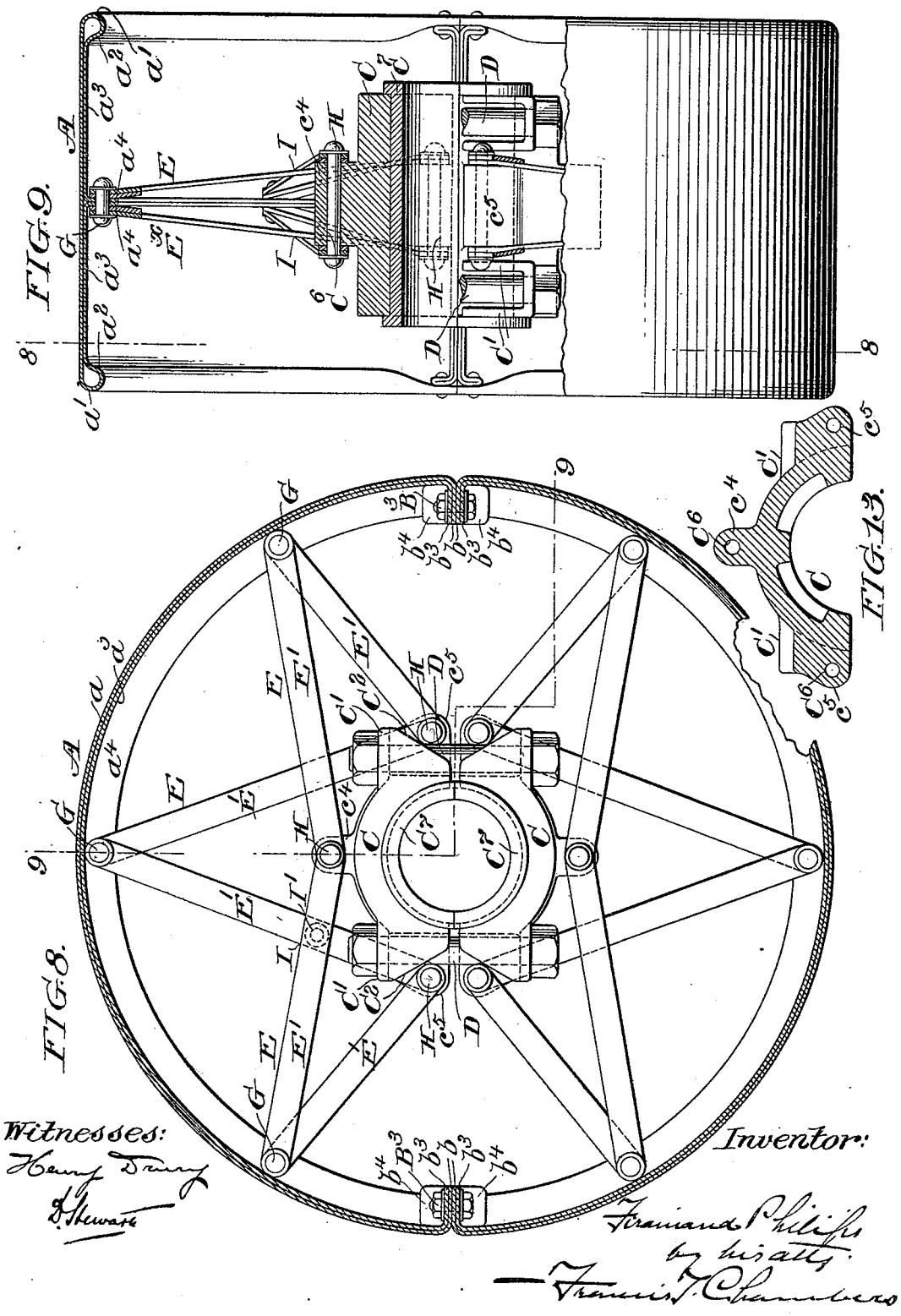

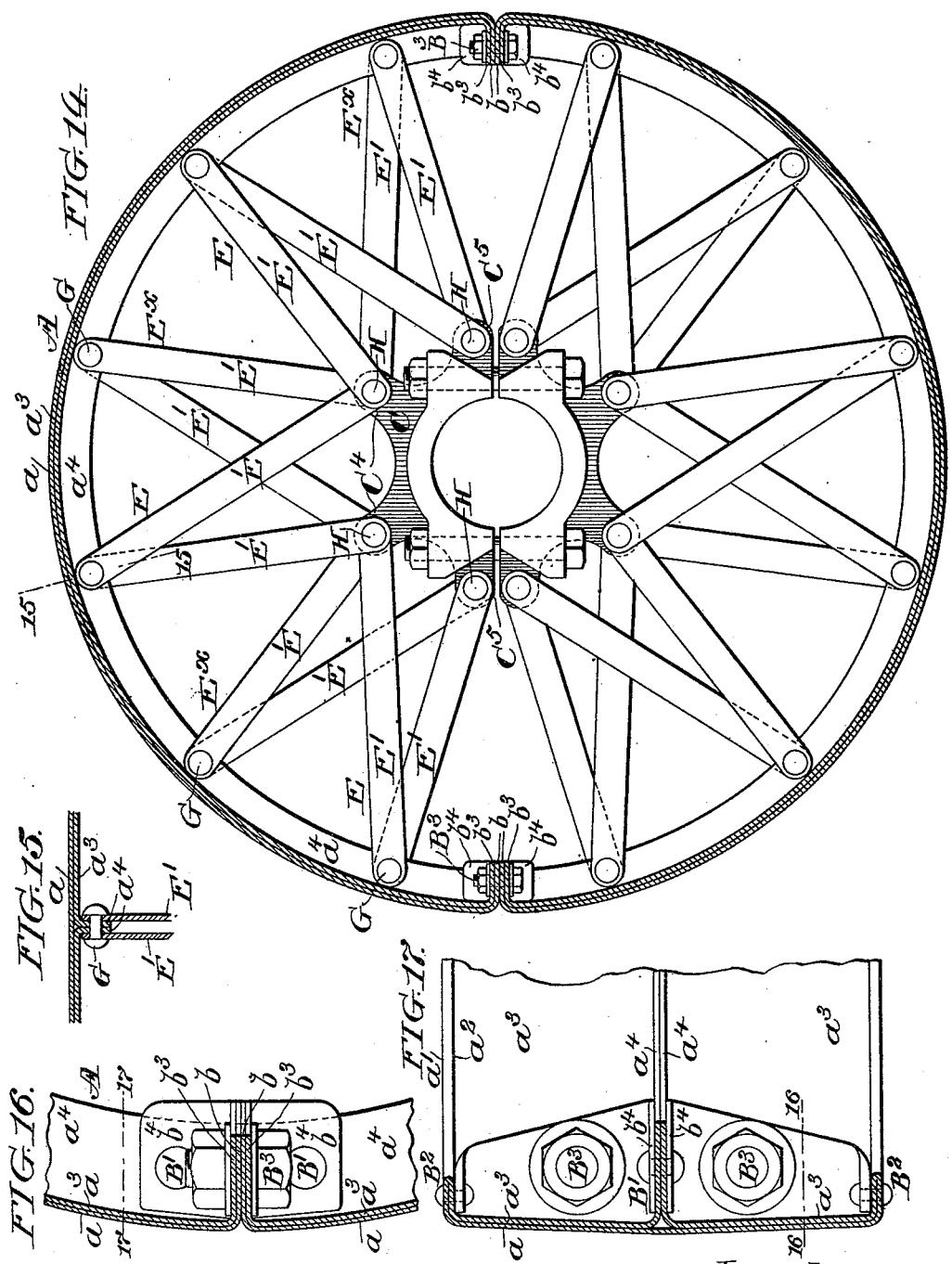

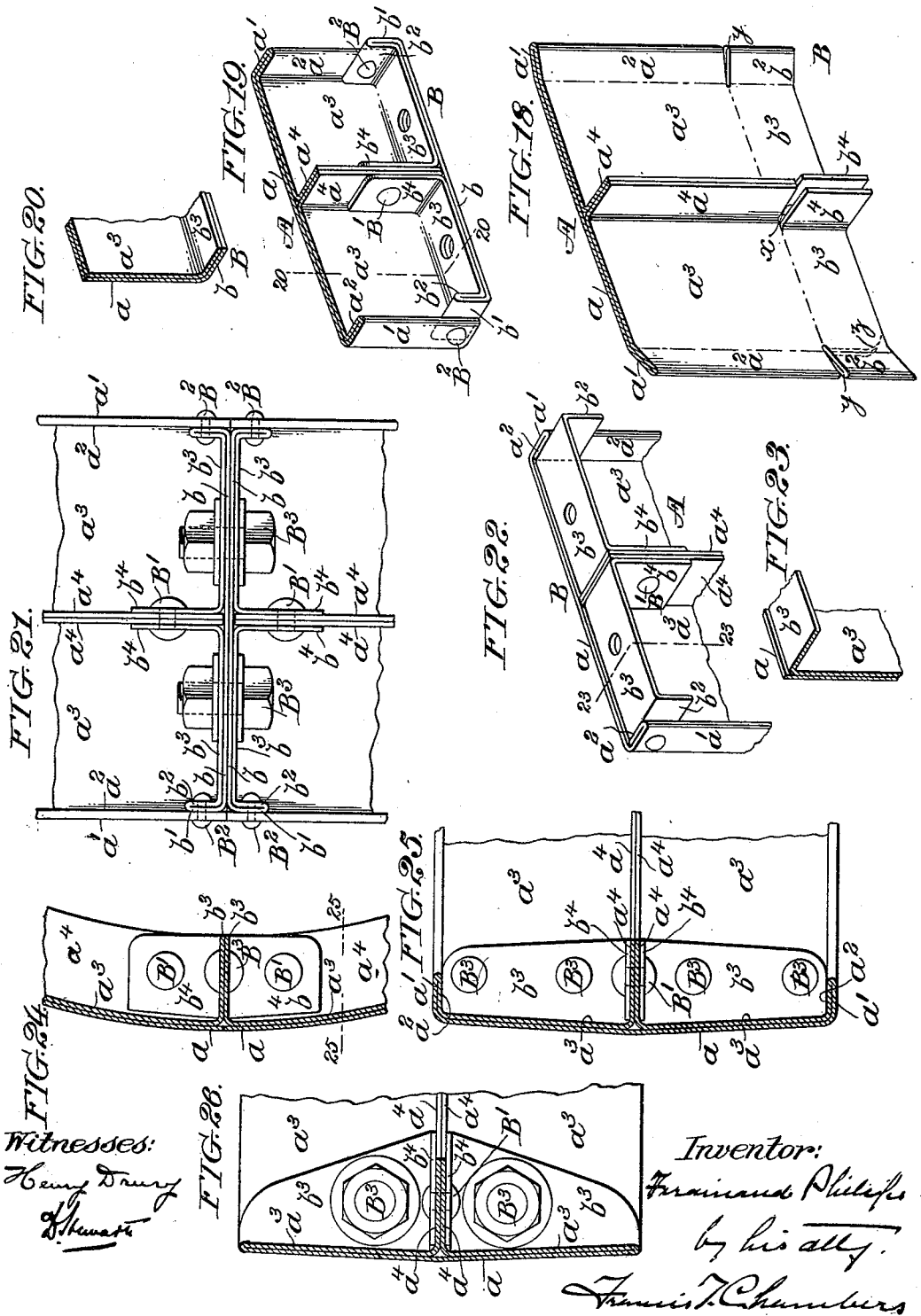

UNITED STATES PATENT OFFICE.

FERDINAND PHILIPS, OF PHILADELPHIA, PENNSYLVANIA.

WHEEL CONSTRUCTION.

SPECIFICATION forming part of Letters Patent No. 641,726, dated January 23, 1900.

Application filed January 21, 1899. Serial No. 702,903. (No model.)

*To all whom it may concern:*

Be it known that I, FERDINAND PHILIPS, a subject of the Emperor of Germany, residing in the city and county of Philadelphia, in the State of Pennsylvania, have invented certain new and useful Improvements in Wheel Construction, of which the following is a true and exact description, reference being had to the accompanying drawings, which form a part thereof.

My invention relates to the construction of wheels, and is particularly adapted for use in the construction of pulleys, the object of my invention being to provide a wheel at once simple, strong, and economical in construction.

My invention consists in part in improvements in the construction of a sheet-metal rim for the wheel, in part in novel and advantageous features of construction in the spokes of the wheel, and in part in particular arrangements and connections of the spokes with the hub and rim.

The nature of my improvements will be best understood as described in connection with the drawings, in which they are illustrated, and in which—

Figure 1 is a side elevation of a wheel embodying my improvements, the rim being shown as in section on the line 1 1 of Fig. 2. Fig. 2 is a view of one-half of the wheel, taken on the section-line 2 2 of Fig. 1. Fig. 3 is a fragmentary view of a portion of the rim, showing a detail of construction. Fig. 4 is a perspective view showing a detail of the spoke construction illustrated in Figs. 1 and 2. Fig. 5 is a plan view of the hub shown in Figs. 1 and 2. Fig. 6 is an end view of one of the hub-sections. Fig. 7 is a view illustrating a modified form of pulley embodying my invention. Fig. 8 is an elevation showing another pulley of modified form, but still embodying my invention, the rim being shown as in section on the line 8 8 of Fig. 9. Fig. 9 is a sectional view taken on the line 9 9 of Fig. 8. Fig. 10 is a plan view of the hub as shown in the pulley illustrated in Figs. 8 and 9. Fig. 11 is an edge view of one section of the hub; Fig. 12, an end view of the same hub-section; Fig. 13, a sectional view of the hub-section, taken as on the line 13 13 of Fig. 10. Fig. 14 is an elevation showing still another pulley embodying another modification of my invention. Fig. 15 is a section through the rim and connected parts of the spokes, taken on the line 15 15 of Fig. 14. Fig. 16 is an enlarged view of the joint by which the divisional rim-sections are secured together, said view being taken as on the line 16 16 of Fig. 17. Fig. 17 is a view of the rim-joint, taken as on the line 17 17 of Fig. 16. Fig. 18 is a perspective view showing the manner in which the rim is cut and folded to form the abutting ends of the joint. Fig. 19 is a perspective view showing the manner in which the plies of the rim are folded and secured together to form the abutting flanges of the joint. Fig. 20 is a section on the line 20 20 of Fig. 19. Fig. 21 is a plan view showing the joint formed between two abutting rim-sections. Fig. 22 is a perspective view illustrating a modification in the formation of the abutting flanges for the joint. Fig. 23 is a section on the line 23 23 of Fig. 22. Fig. 24 is a view illustrating the joint made between two abutting rim-sections having flanges constructed as in Fig. 22. Figs. 25 and 26 illustrate two modifications in the make-up of the joint.

A in all the figures indicates the sheet-metal rim, which may be properly called a "two-ply" rim, as in all parts it consists of two layers or plies of the sheet metal folded the one upon the other. The outer layer of metal I have indicated by the letter $a$ and the inner ply by the letter $a^3$, and preferably I turn the edges of the rim inward, forming inwardly-extending flanges, as indicated at $a'$ and $a^2$. The outer ply of the metal is continuous, forming the face of the wheel or pulley without seam; but the inner plies $a^3$ $a^3$, formed by turning the sheet metal under the ply $a$ at each edge of the rim, are formed with inwardly-turned abutting flanges, as indicated at $a^4$ $a^4$, forming an inwardly-extending two-ply flange, to which the bars forming the spokes of the wheel are to be secured, and for certain constructions to be hereinafter described I prefer to form these inwardly-extending flanges with notches, as indicated at $a^5$ $a^5$. (Best shown in Fig. 3.) For both purposes and for the ordinary construction of pulleys the inwardly-extending flanges $a^4$ $a^4$ will lie in the center of the rim, and the entire rim will consist of an integral sheet of metal, or rather of two such sheets, where, as is usually the case, the pulley is made separable. Where, however, a pulley of great breadth of face is required and where the rim is to be supported by what may be called "two entirely distinct sets of spokes," I construct the rim as is shown in Fig. 7, a second piece of sheet metal, (indicated at $a^6$,) provided with inwardly-turned flanges $a^7$, being set between the inwardly-turned flanges $a^4$ of the plies $a^3$, and in this construction each of the spoke-connecting flanges is formed of the two abutting flanges $a^4$ and $a^7$. As in all sheet-metal rims, joints are necessarily to be provided for between abutted or connected ends of the rim, generally two such joints being used connecting two semicylindrical rim-sections corresponding to two separable hub-sections. Any convenient joint may be used for uniting the rim-sections; but I have invented and prefer to use the joints shown in the drawings and illustrated particularly in Figs. 16 to 26, inclusive. In forming this joint I cut the metal of the flanges $a^4$ $a^4$ as indicated at $x$, Fig. 18, and the flanges $a'$ $a^2$ as indicated at $y$ $y$, Fig. 18, the plan of the cuts being approximately that at which the joint between rim ends or sections is to be made. For the strongest construction of joint I then bend the portion lying to the outside of these cuts upward, as indicated in Fig. 19, the upwardly-turned portion of the outer face or ply of the rim being indicated at $b$ and the upwardly-turned portions of the inner plies $a^3$ being indicated at $b^3$. At the same time I spread the portions of the flanges $a^4$ lying in the turned-up portion, which, as a whole, I have indicated by the symbol B, apart, so that those portions indicated at $b^4$ $b^4$ will lap on each side of the flange formed by the abutted flanges $a^4$, and I lap the turned-up portion of the flange $a'$ $a^2$ on the inside of said flange, as is indicated at $b'$ $b^2$, Fig. 19, and I secure the lapped portions of the flanges together, as by means of rivets. (Indicated at B' and B².) The joint between abutted ends or sections of the rim is then readily formed, as indicated in Fig. 21, bolts or other anchoring devices B³ B³ passing through the abutted inwardly-turned end flanges of the rim-sections.

In many cases it will be unnecessary to make the end abutment flanges so heavy as they are in the above-described construction. Thus in Figs. 22 and 24 I have illustrated a construction in which the outer plies $a$ are turned up and in which the corresponding outer plies $a'$ of the edge flanges of the wheel are not turned in, the end abutment flanges being formed by the upwardly-turned portion $b^3$ of the inner plies $a^3$ of the pulley-rim. This construction has a point of advantage in permitting of the formation of an abutted joint between the unturned edges of the outer plies $a$ $a$ of the rim, as is best shown in Fig. 24. It is even quite sufficient to rely upon the lapped union between the flanges $a^4$ and $b^4$ to hold the end abutting flanges in place, the portion of the upwardly-turned end of the rim corresponding with the edge flanges being cut away, as indicated, for instance, by the dotted line at $y$, Fig. 18, and such a construction is illustrated in Fig. 25, while in Fig. 26 I have shown my abutment-joint applied to a rim made without the inwardly-turned edge flanges.

C C indicate the two halves of a divided pulley-hub having the general characteristics of such hubs as used with divided or sectional pulleys. As shown, they are made with laterally-extending perforated platforms, as indicated at C', supported on inwardly-tapering webs C² and arranged to come opposite to each other, as shown, so that bolts D D, &c., can be used to fasten the two hub-sections together. In this feature my hub does not differ essentially from others in common use. The portion of the hub lying between the platform C' is preferably formed with outwardly-projecting lugs, such as are indicated at C⁴ and C⁵, or in Fig. 8 at $c^4$ and $c^5$, and these lugs or other parts of the hub corresponding to them in position are formed with perforations C⁶, running through them parallel to the axis of the hub and of a size and character adapted to admit of a pin or bolt, such as is indicated at H. As commonly used, the hubs are provided with liners such as are indicated at C⁷ C⁷. (See Figs. 8 and 9.)

I form the spokes of my wheel of relatively wide and thin plates or strips of sheet metal, such as are indicated at E' E' in the drawings, and preferably I stiffen and strengthen these plates by forming in them longitudinal corrugations, as indicated at $e'$, (see Figs. 1 and 2,) and each spoke which is indicated by the letter E consists in my construction of two such wide and thin plates lying in planes substantially parallel to each other and transverse to the axis of the wheel, the plates being at their outer ends secured at a point on the rim of the wheel and diverging thence to two relatively widely separated points on the hub of the wheel, to which points they are secured, so that each spoke consists of what may be called a "triangular truss," with its butt-end fastened to the hub and its apex to the rim of the wheel, and I greatly prefer and recommend that the securing of the spoke-plates to the hub shall in all cases be by means of pin connections, such as the pins H. The outer ends of the spoke-plates may also be secured to the rim or its flange $a^4$ by pin connections, as indicated at G in Figs. 8, 9, and 14; but preferably I secure the outer ends of the spoke-plates not directly together but by rivets, as indicated at $g'$, (see Fig. 1,) to a plate F, (best shown in Fig. 4,) the outer end of this plate being adapted to fit neatly into the notch or recess $a^5$ $a^5$ in the rim-flange and the outer ends of the plates E', extending beyond the plate F, lapping and being secured to the flange $a^4$ by rivets $g$ $g$, as indicated in Figs. 1 and 2.

It is also an important feature of construction in my wheel that two sets of triangular spokes could be used, both secured to the same rim-flange, as $a^4$, but each diverging from the plane of this rim-flange in opposite directions and being secured on opposite ends of the hub, and in the drawings I have indicated the spokes diverging in one direction by the letter E and those diverging in the opposite direction by the symbol $E^\times$. For the most part I have shown in the drawings the spokes of the set E and those of the set $E^\times$ as arranged opposite to each other, so as to form what might be called a "single" spoke of pyramidal outline. In Fig. 14, however, I have illustrated a permissible modification in which the spokes E and the spokes $E^\times$ have their outer ends symmetrically spaced around the circumference of the rim, so as to present the appearance and to a certain extent the qualities of a wheel having double the number of spokes as compared with those of the other figures.

It will be obvious that the means for securing the triangular spokes to the hub-sections may be very considerably varied. Thus in Figs. 1 and 2 I provide each pulley-section with three spokes on each side, and the inner ends of the spoke-plates are secured, as shown, to four perforated lugs $C^4$ and $C^5$, four being secured on the pin H, passing through each of the lugs $C^4$, and two of each of the pins H passing through the lugs $C^5$. In Fig. 8, however, I have shown another construction in which but three perforated lugs are required on each hub-section, four spoke-bars being fastened to each pin H.

Having now described my invention, what I claim as new, and desire to secure by Letters Patent, is—

1. A wheel having its rim and hub connected by a series of wide and thin bars arranged in pairs with their wide sides parallel to each other and lying in planes transverse to the axis of the wheel, each such pair having their outer ends secured to a point on the rim and the bars diverging thence to two separated points on the hub to which they are secured so as to form a triangular truss-spoke as described.

2. A wheel having its rim and hub connected by a series of wide and thin longitudinally-corrugated bars arranged in pairs with their wide sides parallel to each other and lying in planes transverse to the axis of the wheel, each such pair having their outer ends secured to a point on the rim and the bars diverging thence to two separated points on the hub to which they are secured so as to form a triangular truss-spoke as described.

3. A wheel having its rim and hub connected by a double series of triangular truss-spokes secured at their apices to the rim and at their bases to the hub and each lying in a plane transverse to the axis of the wheel, the one series angling from the center of the rim outward toward one end of the hub and the other series angling outward from the center of the rim toward the other end of the hub.

4. A wheel having its rim and hub connected by a double series of triangular truss-spokes each made up of two wide and thin bars secured at their apices to the rim and at their bases to the hub and each lying in a plane transverse to the axis of the wheel, the one series angling from the center of the rim outward toward one end of the hub and the other series angling outward from the center of the rim toward the other end of the hub.

5. A wheel having its rim and hub connected by a double series of triangular truss-spokes each made up of two wide and thin bars the spokes of each series being secured at their apices to the center of the rim and at their bases to the hub and each lying in a plane transverse to the axis of the wheel and being arranged in pairs, one spoke of each series being secured to the same point on the rim and diverging thence toward opposite ends of the hub.

6. A wheel having a rim provided with an inwardly-turned flange formed with notches as $a^5$ $a^5$, in combination with spokes formed of wide and thin bars secured to the rim-flange above such notches, and plates, as F, secured to the spokes and fitting into the notches in the rim-flange.

7. A wheel having a rim provided with an inwardly-turned flange formed with notches, as $a^5$ $a^5$, in combination with triangular truss-spokes formed of wide and thin bars as described, plates F securing said spokes together near their outer ends and said spokes being fastened to the rim by securing their extreme outer ends to the rim-flange and by the engagement of plates F in the notches $a^5$ $a^5$.

8. A wheel having a rim provided with an inwardly-turned flange formed with notches as $a^5$ $a^5$, in combination with triangular truss-spokes formed of wide and thin bars, plates F securing said spokes together in pairs as described and said spokes being fastened to the rim by securing their ends to the rim-flange and by the engagement of plates F with notches $a^5$ $a^5$.

9. A wheel-rim segment formed of a single sheet of metal folded inward under a central section at both sides and downward toward the center of the rim at the ends so as to form a two-ply rim with an intermediate flange or flanges as described.

10. A wheel-rim segment formed of a single sheet of metal folded inward under a central portion at both sides and downward toward the center of the rim at the ends to form a two-ply rim with double centrally-extending flanges at its middle substantially as described.

11. A wheel-rim segment formed of a single sheet of metal folded inward under a central portion at both sides and downward toward the center of the rim at the ends and the folded edges being bent also downward toward the center of the rim all substantially as described and so as to form a two-ply rim with centrally-extending flanges at its middle and lateral edges.

12. A metal rim-section formed with one or more centrally-extending flanges and with end flanges, as $b^3$, formed by turning inward toward the center the metal of the ends of the section, lapping the portions of the centrally-extending flange or flanges corresponding to the turned-in portion of the rim on the adjacent portions of the said flange or flanges and securing said lapped portions together.

13. A two-ply metal rim-section formed of a single sheet of metal with a middle centrally-extending double flange and end flanges $b, b^3$ formed by turning inward the ends of the pulley-section, lapping the section of the middle flange corresponding to said turned-in portion on the adjacent portion of the flange and securing said lapped flange portions together.

14. A wheel having in combination a hub formed with a series of transverse longitudinal perforations, a series of triangular spokes lying transverse to the axis of the wheel, each consisting of two wide and thin bars secured at their inner ends on the same side of the hub by pins passing through different perforations in the hub, and a rim to which the outer ends of the bars forming the triangular spokes are secured.

15. A wheel having in combination a hub formed with a series of transverse longitudinal perforations, two series of triangular spokes lying transverse to the axis of the wheel, each spoke consisting of two wide and thin bars, said triangular spokes being secured at their apices to the rim and the diverging bars being secured to and on the same side of the hub by pins passing through the perforations in the hub and each securing in place the inner ends of two or more bars.

FERDINAND PHILIPS.

Witnesses:
CHAS. F. MYERS,
D. STEWART.